Aug. 30, 1938.  H. S. INDGE  2,128,675
GRINDING WHEEL RECIPROCATING MECHANISM
Filed May 13, 1937  2 Sheets-Sheet 1
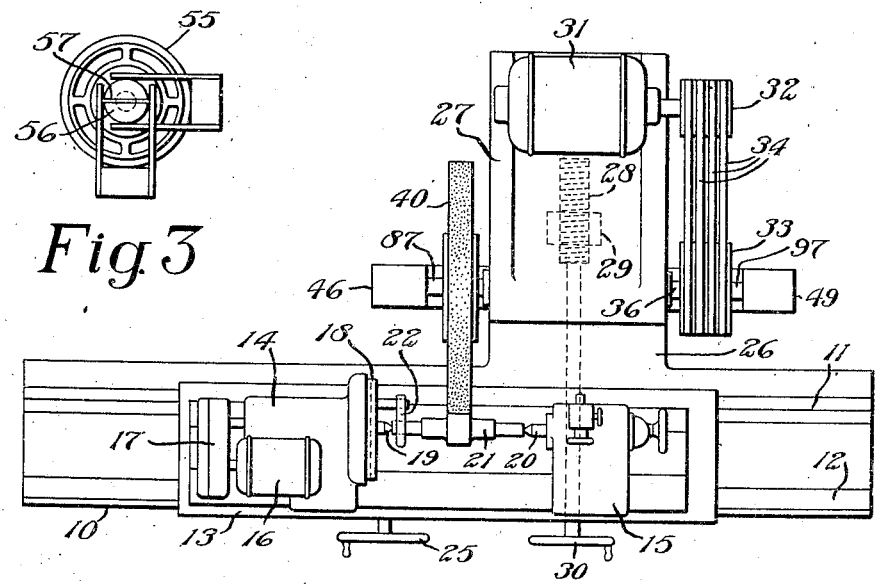
Fig.3
Fig.1
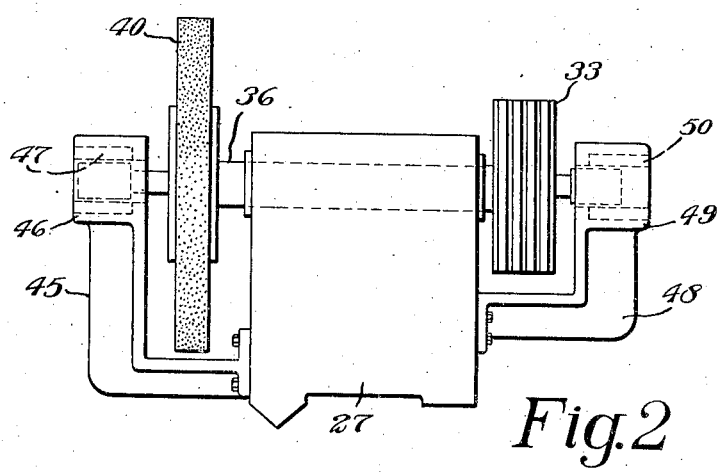
Fig.2
Inventor
HERBERT S. INDGE
By George Crompton Jr.
Attorney Aug. 30, 1938. H. S. INDGE 2,128,675
GRINDING WHEEL RECIPROCATING MECHANISM
Filed May 13, 1937 2 Sheets-Sheet 2

Inventor
HERBERT S. INDGE
By George Ormstrup
Attorney

Patented Aug. 30, 1938

2,128,675

UNITED STATES PATENT OFFICE 2,128,675

GRINDING WHEEL RECIPROCATING MECHANISM

Herbert S. Indge, Westboro, Mass., assignor to Norton Company, Worcester, Mass., a corporation of Massachusetts Application May 13, 1937, Serial No. 142,344

4 Claims. (Cl. 51—50)

The invention relates to grinding machines, and with regard to its more specific features to a grinding wheel reciprocating mechanism.

One object of the invention is to provide a simple and effective mechanism for reciprocating a grinding wheel. Another object of the invention is to provide a grinding wheel adapted to perform so-called plunge-cut grinding efficiently. Another object of the invention is to provide a wheel reciprocating mechanism for such a plunge-cut grinding machine. Other objects will be in part obvious or in part pointed out hereinafter.

The invention accordingly consists in the features of construction, combinations of elements and arrangements of parts, as will be exemplified in the structure to be hereinafter described, and the scope of the application of which will be indicated in the following claims.

In the accompanying drawings showing one of various possible embodiments of the mechanical features of this invention, Figure 1 is a plan view of a grinding machine constructed in accordance with the invention;

Figure 2 is a front elevation of a wheel slide incorporating the invention;

Figure 3 is an elevation of the electric actuating and controlling mechanism;

Figure 4:
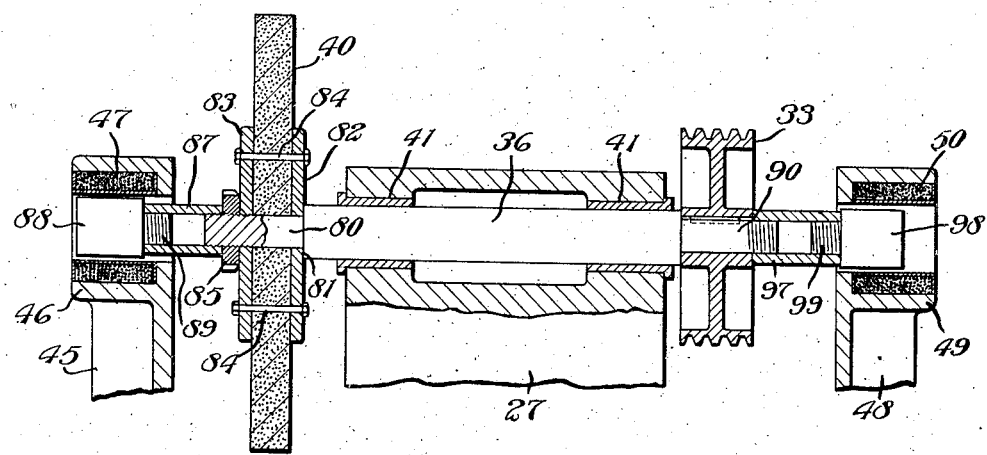
Figure 4 is a sectional view, on an enlarged scale, of the grinding wheel, its mounting and solenoid actuating device.

Referring first to Figure 1, the grinding machine may include a base 10 upon the upper surface of which are formed ways 11, 12 supporting the usual reciprocatory carriage 13 having a headstock 14 and a tailstock 15 adjustably mounted thereon. Incorporated in the headstock is a motor 16 which, by means of reduction gearing in the casing 17, drives a face plate 18. The head center 19 and the tail center 20, the former on the headstock 14 and the latter on the tailstock 15, support a work piece 21 to be ground. The work piece is gripped by a dog 22 connected to the face plate 18. The machine incorporates any usual or desired device for moving the carriage 13 or adjusting its position, for example a rack and pinion gear, not shown, operated by a hand wheel 25.

Mounted on a rearward extension 26 of the base 10 is a cross slide 27. The cross slide can be adjusted in a direction normal to the ways 11, 12 by means of a feed screw 28 controlling a nut 29 secured to the carriage 27, the feed screw 28 being operated by means of a hand wheel 30. Mounted on the cross slide 27 is a motor 31 which drives a pulley 32 which is connected to a pulley 33 by means of a plurality of belts 34. The pulley 33 is mounted on a spindle 36, upon the opposite end of which is mounted a grinding wheel 40.

Referring now to Figures 2 and 4, the spindle 36 between the grinding wheel 40 and the pulley 33 constitutes a straight cylindrical shaft which is journaled in plain bearings 41 in cross slide casting 27, as shown in Figure 2. Consequently, by reason of the fact that the belts 34 are flexible (being preferably V-shaped driving belts), the spindle 36 may move endwise for a limited distance.

Figure 5:
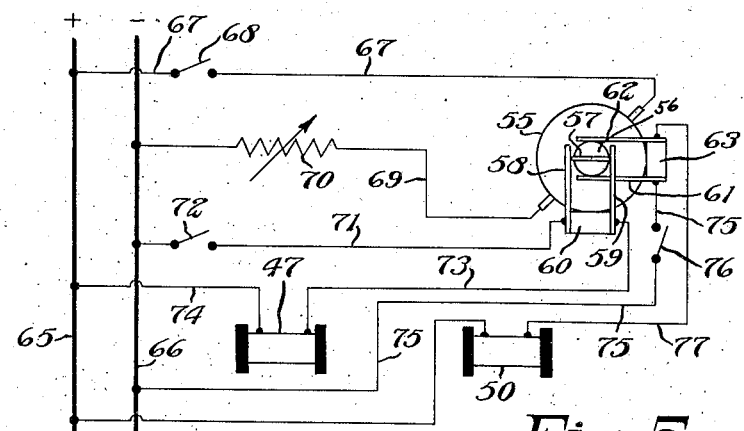
Figure 5 is a wiring diagram.

Bolted to the left-hand side of the wheel head 41 is an angle bracket 45. This bracket 45 has a supporting portion 46 for a solenoid 47. Similarly, to the right-hand side of the cross slide 27 is bolted an angle bracket 48 having a supporting portion 49 for a solenoid 50. As shown in Figures 3 and 5, I provide an electric motor 55 upon the armature shaft of which I mount a commutator insulating ring 56 having a metallic commutator connecter 57 diametrically thereacross. A pair of contact brushes 58 and 59 are mounted on an insulating block 60. A pair of contact brushes 61 and 62 are mounted upon an insulating block 63. The distance between the brushes 58 and 59 is the same as that between the brushes 61 and 62 and is slightly less than the length of the commutator conductor 57. The brushes 58 and 59 as well as the brushes 61 and 62 surround the commutator block 56 and the brushes 58 and 59 are each of them perpendicular to each of the brushes 61 and 62. Consequently, as the commutator 56 is revolved, the brushes 58 and 59 will be connected, and then the brushes 61 and 62 will be connected. With the parts proportioned as shown in Figure 3, the connection between each pair of brushes is maintained for a substantial annular displacement of the commutator member 57, for example 25° thereof at each contact.

Referring now to Figure 5, I provide main line conductors 65 and 66. The motor 55 is connected by a conductor 67 and switch 68 to the line 65 on one side and by a conductor 69 and rheostat 70 to the line 66 on the other side. By means of the rheostat 70 the speed of the motor 55 may be readily varied. The brush 58 is connected to the line 66 by means of a conductor 71 and switch 72. The brush 59 is connected by means of a conductor 73 to one terminal of the solenoid 47. The other terminal of the solenoid 47 is connected by means of a conductor 74 to the line 65. Similarly, the brush 61 is connected by a conductor 75 and switch 76 to the line 66, the brush 62 is connected to one terminal of the solenoid 50 by a conductor 77, and the other terminal of the solenoid 50 is connected by a terminal 78 to the line 65.

By means of the foregoing apparatus, each solenoid 47 and 50 is energized twice during each revolution of the commutator 56, and the energizations are alternate. Energization of each solenoid is followed by a substantial period of deenergization thereof and only one solenoid is energized at a time.

Referring now particularly to Figure 4, the spindle 36 has a reduced portion 80 upon which the grinding wheel 40 is mounted. A shoulder 81 on the spindle 36 provides the backing for a plate 82 which is bolted to a plate 83 by bolts 84 extending through the grinding wheel 40. The reduced portion 80 is threaded and is in threaded engagement with the plate 83. A nut 85 mounts the wheel upon the spindle and secures it thereto. The threaded portion 80 of the spindle 36 extends beyond the nut 85 and a brass sleeve 87 which is internally threaded is mounted thereon. Secured to the other end of the brass sleeve 87 is a core 88 which may take the form of a cylinder of soft iron having a reduced threaded projecting portion 89 which is in threaded engagement with the inside of the sleeve 87.

Referring now to the right-hand side of Figure 4, at the right-hand end of the spindle 36 is a reduced portion 90 upon which is mounted the pulley 33 that is keyed thereto. The right-hand extremity of the reduced portion 90 is threaded, and screwed thereon is a brass sleeve 97 upon the far end of which is mounted a soft iron core 98 which may be identical with the core 88, having also a threaded portion 99 for connection to the sleeve 97.

As indicated in Figure 4, when one core 88 is in the center of a solenoid, the other core is slightly withdrawn therefrom. As first one and then the other solenoid is energized, first one and then the other core 88 and 98 is drawn into the corresponding solenoid 47 and 50. This reciprocates the spindle 36 and, therefore, the ginding wheel 40.

Particular features of this manner of reciprocating the wheel 40 are that in the first place, it is achieved with a minimum of vibration and in the second place, without setting up reaction strains in any of the machine parts, particularly torsional strains such as are generated by bell crank levers and the like. The speed of reciprocation can be instantly varied over a wide range by means of the rheostat 70.

There is in the mechanism described no positive stop for the spindle 41 in its reciprocation, but at high speeds the spindle does not travel far enough to cause the grinding wheel to engage the cross slide or the bracket 45 prior to energization of the other solenoid which pulls the parts in the opposite direction. In other words, the normal amplitude of the spindle 36 is much less than the limits of amplitude due to mechanical clearances. At low speeds the solenoid which is pulling upon its core will restrain it from moving beyond the center position, as the solenoid tends to center its core. Thus under all conditions of operation the direction of reciprocation is reversed electrically. The result is a very smooth action free from vibration, chatter or distortion of any type.

For grinding certain types of work pieces or surfaces thereof, it is preferred to feed the grinding wheel straight into the work without wide relative reciprocation such as produced by movement of the reciprocatory carriage 12. It is found, however, that in order to eliminate grinding lines, it is preferable to reciprocate the wheel with a limited amplitude of reciprocation. The mechanism of the present invention provides a highly effective means for thus reciprocating the wheel. The amplitude of reciprocation of the wheel 40 may be considerably varied but is usually of the order of a small fraction of an inch, especially at the higher cycles of reciprocation. The reciprocation itself may be termed a vibration as it is feasible to vibrate the wheel at many different speeds of vibration including those of the order of 60 cycles a second, faster and slower.

Figure 6:
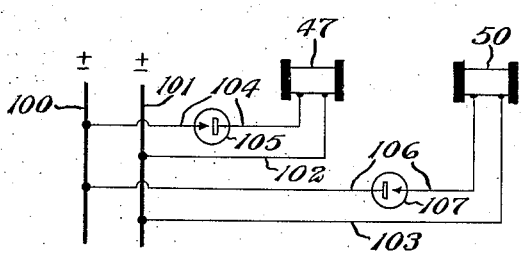
Figure 6 is a wiring diagram showing a modification of the invention.

Referring now to Figure 6, I have therein shown a modification of the invention which in some respects is simpler than the embodiment previously described. In this modification of the invention, however, the rate of vibration is 60 cycles a second in those portions of the United States where alternating current of 60 cycles is available, and 25 cycles a second in those portions of the United States where 25 cycle current is available. In Europe and places where 50 cycle current is used, the rate of vibration would be 50 cycles. In other words, according to this embodiment of the invention in Figure 6, the rate of vibration of the wheel is the same as that of the frequency of the current available.

In the modification of Figure 6, the mechanical parts and features are or may be substantially as already described. Solenoids 47 and 50 are provided. I further provide main line conductors 100 and 101 energized with single phase alternating current, for example 110 volts at 60 cycles. I connect one terminal of the solenoid 47 to the line 101 by means of a conductor 102. I connect one terminal of the solenoid 50 to the line 101 by means of a conductor 103. I connect the terminal of solenoid 47 to the line 100 by means of a conductor 104 in which is interposed a rectifier 105. I connect the other terminal of the solenoid 50 to the line 100 by means of a conductor 106 in which is interposed a rectifier 107.

It will be apparent that since current can flow only one way through each circuit including the solenoids 47 and 50 respectively, each solenoid 47 and 50 will be alternately energized and deenergized with alternations of the current. Furthermore, as the rectifiers 105 and 107 are oppositely oriented, the solenoids 47 and 50 will be alternately energized. This will cause the wheel 40 to vibrate with the frequency of the current. I have found that an excellent finish is achieved with a grinding wheel vibrating at a frequency of the order indicated.

So far as certain features of the invention are concerned an electromagnet and an armature might be substituted for a solenoid and a core, but the solenoid and core has the advantage that a more constant pull over a greater amplitude is achieved.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:—

1. In apparatus of the class described, an abrasive wheel, a spindle therefor, a pair of electromagnetic devices one of which will pull the spindle in one direction and the other of which will pull the spindle in the other direction, a source of alternating current, lines connecting each electromagnetic device to the source, and rectifiers interposed in the lines whereby to vibrate the abrasive wheel with the frequency of the alternating current.

2. In apparatus of the class described, an abrasive wheel, a spindle therefor, electromagnetic means to vibrate the spindle axially, a commutator to control the electromagnetic means, and means to vary the speed of rotation of the commutator whereby to vary the frequency of vibration of the abrasive wheel.

3. In apparatus of the class described, an abrasive wheel, a spindle therefor, a pair of solenoids, a pair of cores, two of said last mentioned four parts being attached to the spindle and rotating with it, the other two of the said last mentioned four parts being relatively stationary, a commutator to control the energization of the solenoids, and means to vary the speed of rotation of the commutator whereby to vary the frequency of vibration of the abrasive wheel.

4. In apparatus of the class described, an abrasive wheel, a spindle therefor, a pair of solenoids, a pair of cores, two of said last mentioned four parts being attached to the spindle and rotating with it, and the other two of the said last mentioned four parts being relatively stationary, and alternating current means and rectifiers connected to the solenoids alternately to energize them whereby to vibrate the abrasive wheel with the frequency of the alternating current.

HERBERT S. INDGE.